No. 894,709. PATENTED JULY 28, 1908.
W. SCOTT.
CHANGEABLE SPEED GEARING.
APPLICATION FILED NOV. 26, 1907.
2 SHEETS—SHEET 1.
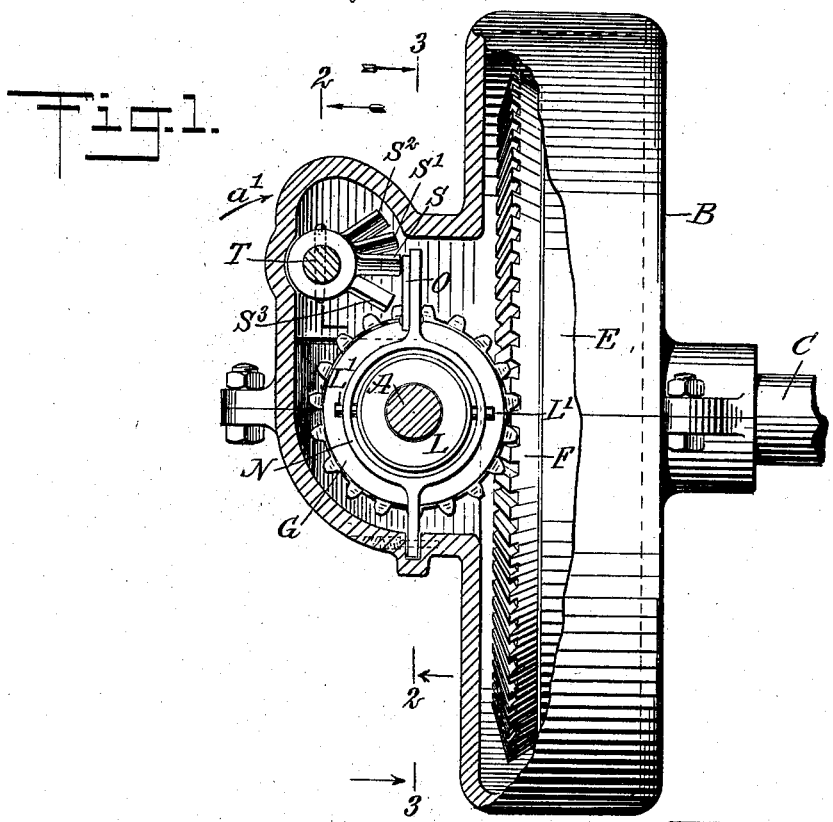
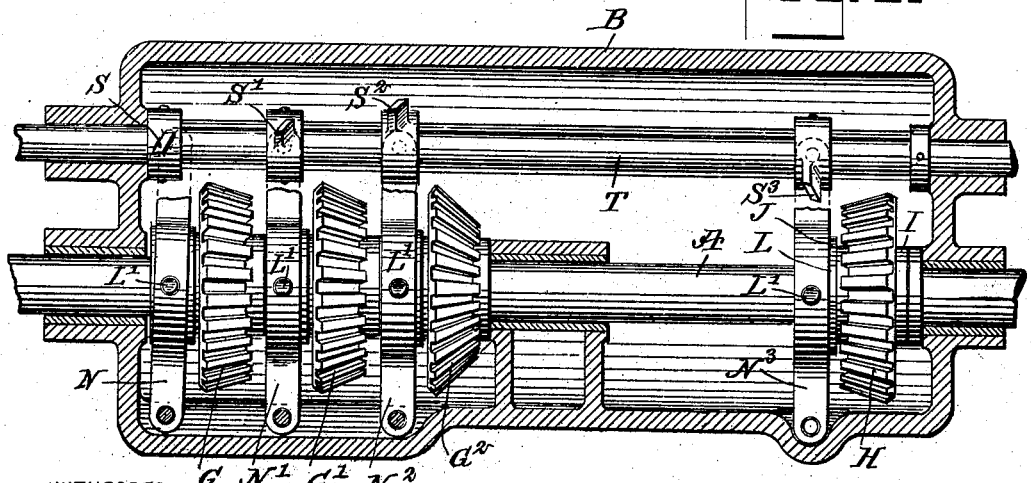
WITNESSES
INVENTOR
Walter Scott
BY
ATTORNEYS No. 894,709. PATENTED JULY 28, 1908.
W. SCOTT.
CHANGEABLE SPEED GEARING.
APPLICATION FILED NOV. 26, 1907.

2 SHEETS—SHEET 2.

WITNESSES
INVENTOR
Walter Scott
BY
ATTORNEYS

UNITED STATES PATENT OFFICE.

WALTER SCOTT, OF SHERIDAN, WYOMING.

CHANGEABLE-SPEED GEARING.

No. 894,709.　　　　　Specification of Letters Patent.　　　Patented July 28, 1908.

Application filed November 26, 1907. Serial No. 403,892.

*To all whom it may concern:*

Be it known that I, WALTER SCOTT, a citizen of the United States, and a resident of Sheridan, in the county of Sheridan and State of Wyoming, have invented a new and Improved Changeable-Speed Gearing, of which the following is a full, clear and exact description.

The object of the invention is to provide a new and improved changeable speed gearing, more especially designed for use on automobiles and other motor vehicles and machines, and arranged to permit the operator to conveniently and quickly change the speed of the driven shaft or axle, or to reverse the same whenever it is desired to do so.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 3:
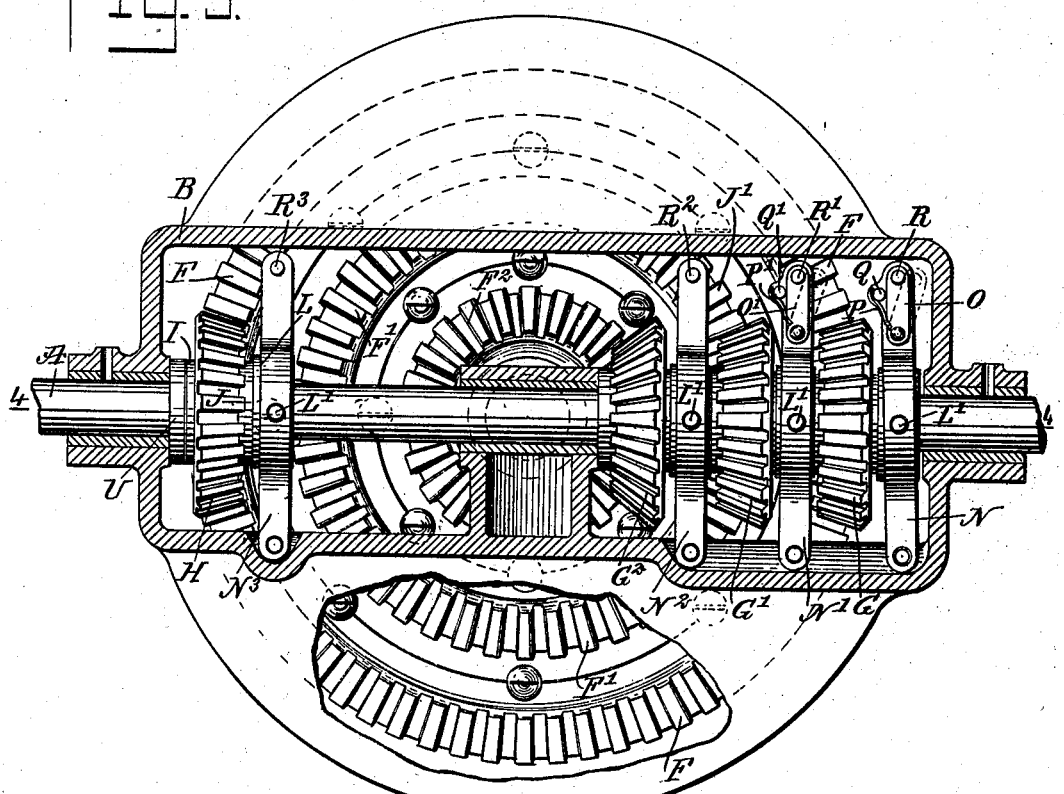
Figure 4:
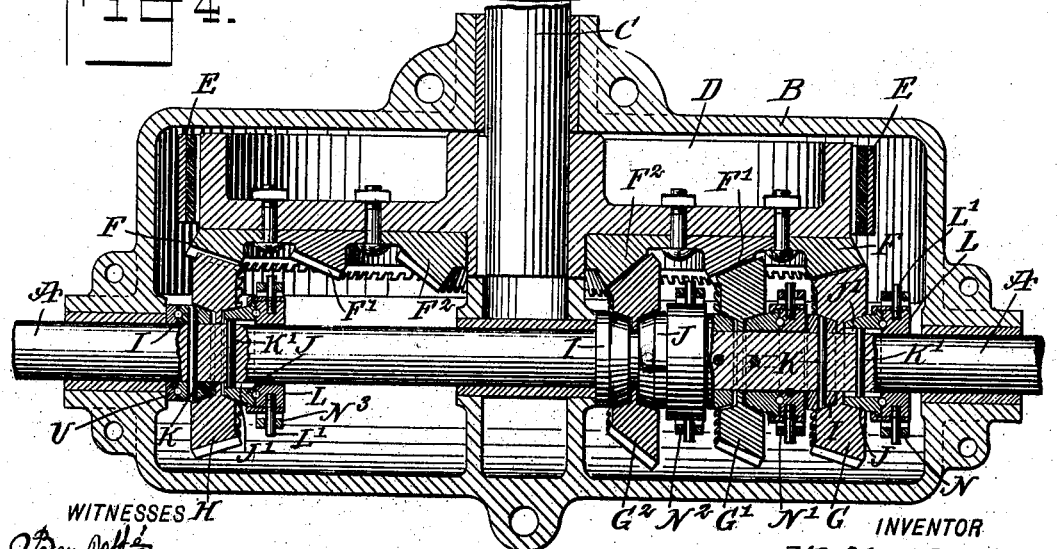

Figure 1 is a cross section of the improvement; Fig. 2 is a longitudinal sectional elevation of the same, on the line 2—2 of Fig. 1; Fig. 3 is a similar view of the same on the line 3—3 of Fig. 1; and Fig. 4 is a sectional plan view of the same on the line 4—4 of Fig. 3.

The driving shaft A is connected with an engine or other motor, and extends into and is journaled in a casing B, in which is also journaled one end of a driven shaft C, arranged at right angles to the driving shaft A, and connected in the usual manner with the object to be driven. The shaft C may also represent the axle of the vehicle in case a direct drive is desired. On the driven shaft C is secured a brake drum D, adapted to be engaged by the brake band E under the control of the operator, for braking the brake drum D and the driven shaft C whenever it is desired to do so.

On the face of the brake drum D within the casing B are arranged concentric bevel gear wheels F, F' and F², in mesh at one side of the axis of the shaft C with bevel pinions G, G' and G², respectively, the outermost bevel gear wheel F being also in mesh with a reversing bevel pinion H on the other side of the axis of the shaft C, as plainly indicated in the drawings. Each of the pinions G, G', G² and H is mounted to turn loosely on the members I and J of friction clutch mechanisms, and of which members the member I is secured by a pin K to the driving shaft A, while the other clutch member J is provided with longitudinally extending grooves J', into which project the ends of a pin K' secured to the driving shaft A, thus allowing the clutch member J to slide lengthwise on the driving shaft A, and at the same time the clutch member J is carried round with the driving shaft A by the pin K'. As indicated in the drawings, the clutch members I and J for each pinion G, G', G² and H engage the latter at opposite sides, so that when the clutch member J is shifted towards the clutch member I, then the corresponding pinion G, G', G² or H rotates with the shaft A by the corresponding clutch mechanism in action at the time. The movable clutch members J are engaged by shifting collars L, mounted loosely on the shaft A and having pins L' engaged by levers N, N', N² and N³, to actuate the clutch members J for the different pinions G, G', G² and H, respectively. The shifting levers N, N' are provided at their free ends with pivoted arms O and O', pressed on by springs P, P', and normally held against stop pins Q, Q' by the action of the springs P, P' (see Fig. 3). The free ends of the arms O, O' are provided with pins R, R' and similar pins R², R³ are arranged on the free ends of the shifting levers N² and N³. The several pins R, R', R² and R³ are adapted to be engaged by cam arms S, S', S² and S³, secured on the controller shaft T, journaled in the casing B and under the control of the operator, to permit the latter to turn the said shaft T with a view to bring either of the cam arms S, S', S² or S³ in engagement with the corresponding pin R, R', R² or R³, to shift the respective lever N, N', N² or N³, with a view to throw the corresponding clutch mechanism in engagement with the pinion G, G', G² or H. The cam arms S, S', S² and S³ radiate from the shaft T and stand at given angles one relative to the other, as plainly indicated in Figs. 1 and 2, so as to enable the operator to bring either one of the said cam arms in operative engagement with the corresponding pins R, R', R² or R³.

When it is desired to drive the shaft C forward, then the controller shaft T is turned in the direction of the arrow $a'$, so as to cause the corresponding arm S, S' or S² to shift the corresponding lever N, N' or N², but when it is desired to rotate the shaft C in a reverse direction then the operator turns the controller shaft T in the reverse direction of the arrow a', to bring the arm S³ in operative relation to the pin R³ of the shifting lever N³.

When the controller shaft is moved the cam arms S, and S' are the only ones which pass entirely past the corresponding pins, and the purpose of the spring pressed links O, O is to permit the cams to be turned back to their original position, since the levers N, N' cannot be moved backwardly sufficiently to let the cams pass on the return movement.

It is understood that when the pinion G is connected with the shaft A by the corresponding friction clutch, then the gear wheel F is rotated and with it the shaft C at a slow but powerful speed, and when the pinion G' is locked to the shaft A by its friction clutch, then the gear wheel F' is rotated at an intermediate speed, and when the pinion G² is locked to the shaft A it rotates the bevel gear wheel F² at a high rate of speed but with less power. When the pinion H is locked to the shaft A by its friction clutch then the gear wheel F and the shaft C are turned in the reverse direction.

Although I have shown and described but three gear wheels and three pinions in mesh with the gear wheels for driving the shaft C forward, it is evident that more or less such gear wheels and pinions may be employed, if desired.

Ball bearings are preferably interposed between the movable clutch member J and the shifting collar L, as indicated in Fig. 4, and a ball thrust bearing U is engaged by the fixed clutch member I for the pinion H to take up the end thrust of the driving shaft A.

Having thus described my invention, I claim as new and desire to secure by Letters Patent:

1. A changeable speed gear comprising a driven shaft, a plurality of concentric gear wheels secured to the said driven shaft, a driving shaft at a right angle to the said driven shaft, a plurality of normally loose pinions in mesh with the said gear wheels on one side of the axis thereof, a normally loose reversing pinion in mesh with one of the said gear wheels on the other side of the axis thereof, clutch mechanisms for engagement with the said pinions and mounted to slide on and to turn with the said driving shaft, shifting levers for shifting the said clutch mechanisms pins fixed on sundry of the said shifting levers, spring-pressed swing arms pivoted on the remaining shifting levers, each swing arm carrying a pin, a controller shaft, and cam arms radiating at different angles from the said controller shaft and adapted to engage the said pins to actuate the corresponding shifting lever.

2. A changeable speed gear provided with a shifting device for a plurality of independent clutches, comprising shifting levers for shifting the said clutches, pins fixed on sundry of the said shifting levers, spring-pressed swing arms pivoted on the remaining shifting levers, each swing arm carrying a pin, a controller shaft, and cam arms radiating at different angles from the said controller shaft and adapted to engage the said pins to actuate the corresponding shifting levers.

In testimony whereof I have signed my name to this specification in the presence of two subscribing witnesses.

WALTER SCOTT.

Witnesses:
 JAMES L. BENTLEY.
 LEANDER A. KEMP.